Sept. 11, 1962 J. W. BRUBAKER 3,053,485
FLIGHT CONTROL SYSTEM
Filed July 1, 1960 2 Sheets-Sheet 1

INVENTOR:
John W. Brubaker
By Smyth, Roston & Pavitt
Attorneys.

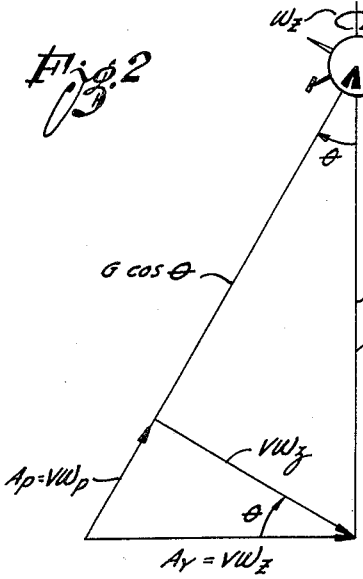
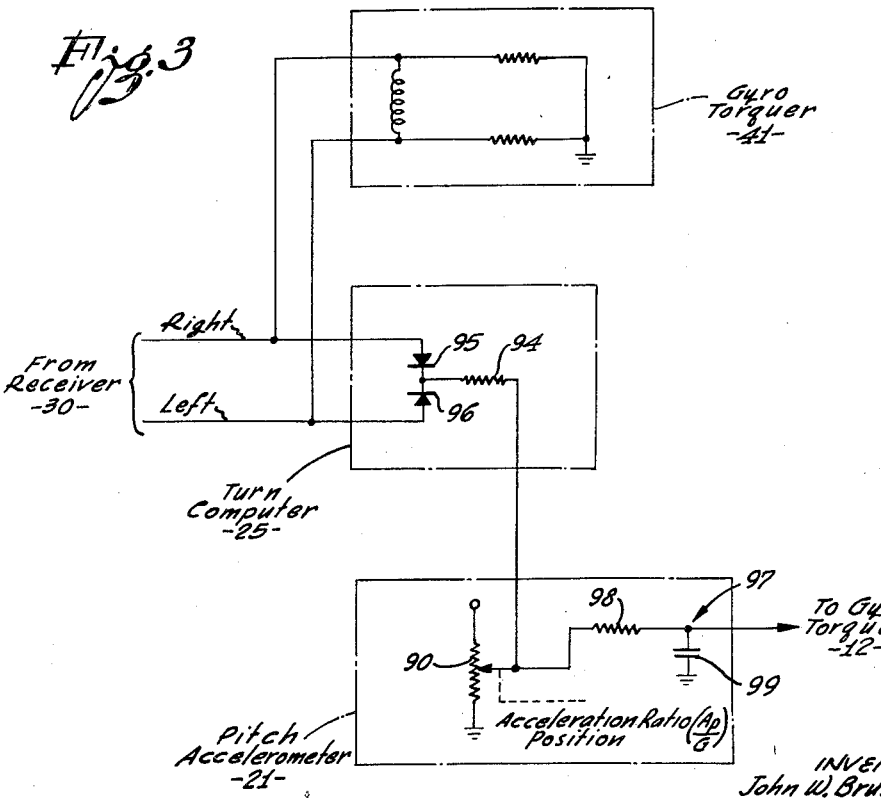

United States Patent Office 3,053,485
Patented Sept. 11, 1962

3,053,485
FLIGHT CONTROL SYSTEM
John W. Brubaker, Palos Verdes Estates, Calif., assignor to Telecomputing Corporation, Los Angeles, Calif., a corporation of California
Filed July 1, 1960, Ser. No. 40,378
11 Claims. (Cl. 244—77)

This invention relates to a flight control system, and more particularly, to such a system adapted for controlling the flight of a target drone or pilotless aircraft.

Present day operational target drones are usually flown out of sight under control of a ground based operator. By utilizing tracking radar equipment, the operator is informed of the altitude and direction of flight of the drone. Due to the high speeds of such aircraft, the time lag between the actual change of altitude or course, and the operator sensing and responding to such change, results in the operator tending to over-control or under-control the aircraft. Autopilot equipment has, accordingly, been developed for controlling the flight of the pilotless aircraft subject to commands from the ground based operator. The equipment, however, is complex and expensive and, moreover, does not solve a number of important flight control problems.

For example, the various altitude control apparatus heretofore utilized in autopilot equipment has been unsatisfactory. Altitude control apparatus utilizing proportional altitude reference to provide an error signal directly into the elevator positioning system is inadequate because such apparatus lacks sufficient stability. Other control apparatus which stabilizes the pitch axis of the aircraft by a rate gyro to control the altitude is unsatisfactory because of gyro drift.

The method of altitude control generally utilized is one where the altitude displacement from a given reference is compared with a pitch attitude angle such as to cause a balance between these two signals. The aircraft ultimately flies at a constant altitude which is in error from the reference altitude as a result of out-of-trim conditions due to aerodynamics or the autopilot. For long periods of flight, such a method usually requires a reference gyro having a spin axis remaining at an average vertical. Unfortunately, such a vertical gyro is not only complex and expensive, but is subject to acceleration errors. These errors occur due to turning angular velocities or fore and aft accelerations due to change in thrust, or change in velocity due to climbing or diving. The gyro is also subjected to turning errors which arise from friction about its gimbal pivots, and due to wiper friction and bearings, which tend to cause its spin axis to align itself with the turning axis of the aircraft. The result of such phenomena, when turnng in one direction, is to cause the gyro to spirally diverge from the vertical so that the aircraft flies in an alternately diving and climbing position throughout an aerodynamic turn.

The vertical gyro moreover generally has a limited freedom in pitch and sometimes also about its roll axis. If the aircraft overshoots a desired bank angle, the gyro gimbals may hit their stops, thus precessing the gyro and destroying the vertical reference. The result is that the aircraft is usually put into an adverse pitch attitude causing it to be aborted from its mission.

In still other altitude control apparatus, which utilizes rate integrating gyros, a computer on the ground determines a pitch-rate gyro correction. Such apparatus is expensive because of the necessity for the computer on the ground, and because various instruments are required at the aircraft or on the ground for determining the speed of the aircraft in space, and equipment is required at the aircraft for determining the aircraft banking angle and for transmitting such information to the computer on the ground. The different altitude control apparatus utilized in conventional flight control systems, accordingly, has one or more various disadvantages.

In a specific illustrative embodiment of this invention, the various disadvantages of the prior control systems are overcome utilizing a flight control system having a first rate integrating gyro in the pitch mode, and a second rate integrating gyro for the yaw and azimuth control. The gyros respectively form parts of a longitudinal subsystem and a lateral subsystem in the drone aircraft. The two subsystems are responsive to commands from a remote ground position for maintaining the aircraft in level flight or in a climb or dive. The aircraft may be turned laterally while either in level flight or in a climb or dive.

Means are provided responsive to an altitude hold command from the ground position for introducing a first altitude error signal directly to the elevator control apparatus and a second altitude error signal of smaller magnitude than the first signal to the torquer of the pitch rate integrating gyro. The first signal provides a short term control and the second signal provides a long term control for settling the aircraft to a predetermined altitude. The larger magnitude first altitude error signal is effectively compared with the control signal developed by the pitch rate integrating gyro, and the smaller magnitude second signal causes the reference axis of the gyro to gradually change its position at an angular rate proportional to its magnitude. The combination of the two signals causes the aircraft to gradually approach the predetermined altitude. The control is achieved in the gyro utilizing differentiating means for providing back to the gyro torquer a signal in accordance with the rate of pitch change.

Further features of this invention relate to the provision of computer means for compensating for the increase in pitch during a coordinated turn. The pitch gyro senses the increase of pitch and tends to cause the aircraft to dive. The computer means, however, develops a signal related to the yaw rate and acceleration normal to the pitch and roll axes which is substantially equal to the pitch-up effect during the turn. During the altitude hold mode, the altitude error signal provides a fine vernier correction for the computer compensating signal. During climbing or diving modes, the altitude signal is gated. The computer means eliminates any tendency of the aircraft to alternately climb and dive during a turn because of the aircraft bank.

Further advantages and features of this invention will become apparent upon consideration of the following description when read in conjunction with the drawing wherein:

FIGURE 2 is an acceleration vector diagram of an aircraft in a coordinated turn; and FIGURE 3 is a circuit representation of the turn compensator computer utilized in the flight control system of this invention.

Figure 1:
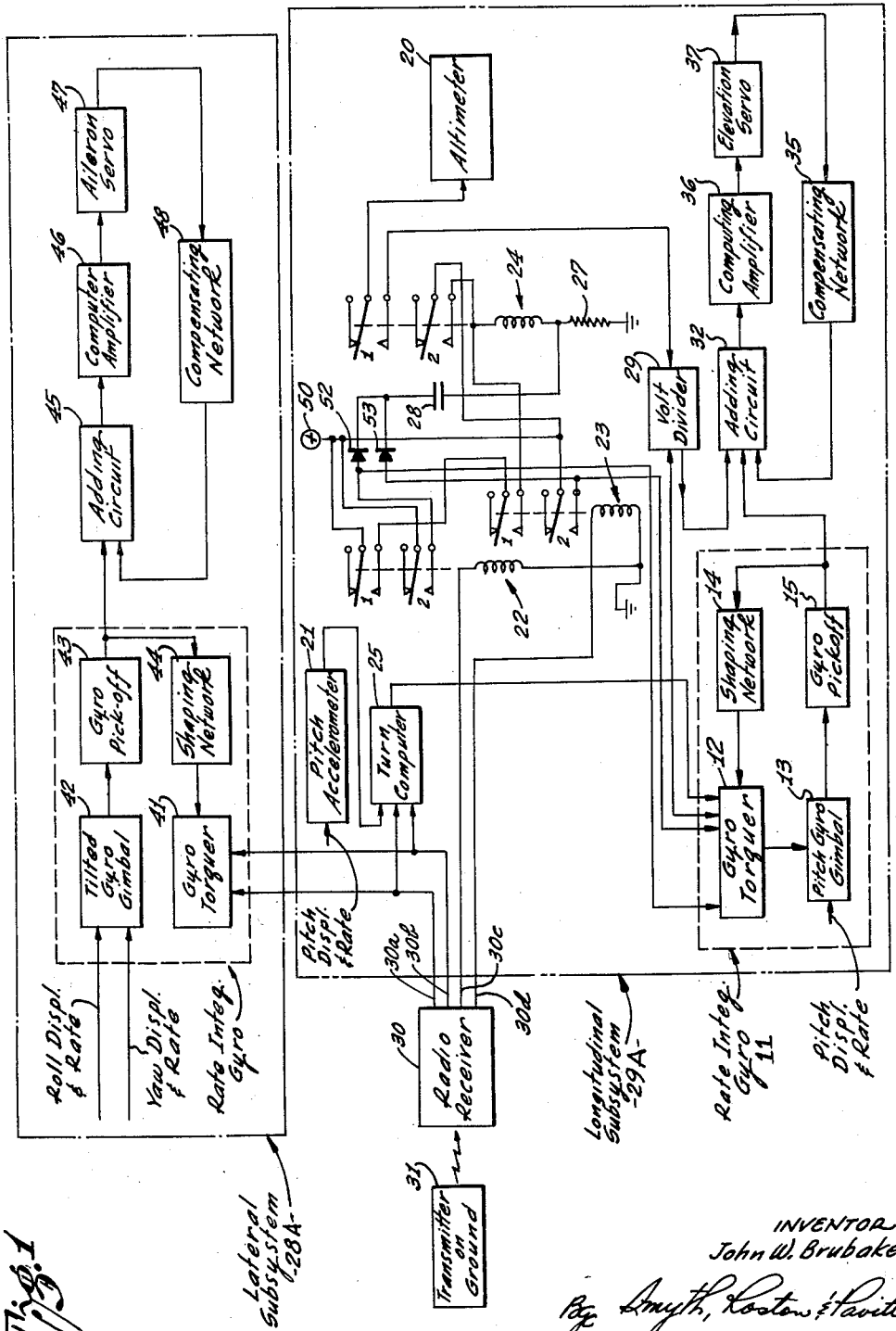
FIGURE 1 is a functional diagram of the flight control system of this invention.

Referring first to FIGURE 1, the flight control system functionally depicted therein is basically a three-axis autopilot which is remotely controlled or commanded by a ground control operator, and which may be supported in a pilotless aircraft or drone, not shown. A receiver 30 at the aircraft functions to receive the commands from a transmitter 31 operated by the ground control operator. The transmitter 31 at the ground location functions together with the receiver 30 to establish a communication link between the ground position and the aircraft.

The ground control operator can send commands over the communication link to the aircraft to perform the following functions:

a. to change the pitch attitude of the aircraft;
b. to lock the aircraft in at a particular attitude; and
c. to turn the aircraft right or left either at a constant altitude or when climbing or diving.

The system at the aircraft responds to each command from the ground position and continues to so respond until the next command is received. The signals may, illustratively, be pulse width modulated signals with the width of the pulse indicating the magnitude of the particular control, and the repetition rate or frequency of the pulses identifying the particular control. Four control signals may be utilized, each having a different audio frequency, and all four control signals being either amplitude or frequency modulated on a carrier. The composite transmitted signal consists then of a carrier modulated by four audio frequencies which are separately pulsed and with the width of the pulses being indicative of the magnitude of the control.

The four control signals are utilized respectively to indicate a right turn, a left turn, a climb and a dive. The simultaneous transmission of the climb and dive signals indicates an altitude hold condition. There are, therefore, five different specific controls which can be initiated at the transmitter 31 on the ground or other remote location for controlling the flight of the drone aircraft. The present invention is not restricted to the particular modulation system briefly described above as, for example, five different control signals may be utilized or different carriers may be utilized. The particular transmission system is, accordingly, merely illustrative.

The flight control system includes a lateral subsystem 28A, shown functionally in the upper portion of FIGURE 1, and a longitudinal subsystem 29A shown functionally in the lower portion of FIGURE 1. Assume first that the "up" or climb and the "down" or dive control signals are simultaneously transmitted to set the longitudinal subsystem 29A to a condition for maintaining the drone aircraft at a constant altitude. The receiver 30 has four output leads 30a to 30d which are selectively energized in accordance with the received control signals. The receiver 30 includes means, not shown, for selectively developing at the leads 30a to 30d, signals having a magnitude and polarity related to the pulse widths of the respective control signals. With the "up" and "down" control signals simultaneously received, the leads 30c and 30d at the output of the receiver 30 are energized.

The leads 30c and 30d are connected respectively to the windings of two relays 22 and 23. The other terminals of these windings are connected to a common ground connection. The energization of both leads 30c and 30d accordingly energizes the two windings of the two relays 22 and 23. When the two relays 22 and 23 are operated, they in turn operate an altitude hold relay 24. The relay 24 is operated over a path from a positive potential source 50 through the operated armature 1 of the relay 22, the operated armature 1 of the relay 23, the winding of relay 24 and a resistor 27 to the common ground connection.

As is hereinafter described additional paths are established respectively by the relays 22 and 23 through a capacitor 28 to the junction of the winding of relay 24 and the resistor 27. These paths function to return the relay 24 to normal if either an "up" or a "down" control signal alone is received. When an "up" or "down" signal alone is received, the received pulse duration and the duration of the operation of the respective relay 22 and 23 is relatively short. For a short input pulse, a path through the capacitor introduces an equal potential to the opposite side of the winding of relay 24 causing it to release.

However, when the "up" and "down" signals are simultaneously provided, they are provided for a relatively long duration so that the pulse through the capacitor 28 terminates while operating potential is still being applied by the relays 22 and 23 to the upper terminal of the winding of relay 24. Relay 24 accordingly operates. When the relay 24 operates, it locks operated and it connects an altimeter 20 to a voltage divider 29.

When the aircraft is in the level flight or altitude hold mode, the altimeter or altitude sensor 20 is the primary reference in the flight control system. The altitude sensor 20 provides an error signal which is proportional to the error of the aircraft above or below the desired altitude at the instant the hold signal is received. As is hereinafter described, this error signal is compared with the pitch attitude of the aircraft so as to create a signal which causes the aircraft to climb or dive and reduce the error signal. Upon returning to the desired altitude, the aircraft maintains level flight unless the zero reference pitch attitude angle is not that value which will cause level flight. In the latter case, the aircraft will then fly slightly above or below the desired altitude so as to provide the necessary error signal to maintain the pitch attitude angle for level flight. The altitude error signal, due to flying slightly above or below the desired altitude, is utilized to gradually change the pitch attitude of the aircraft until a zero altitude exists. Such a control, referred to as an integral control, is achieved by injecting the altitude error signal into a pitch gyro torquer 12 of a rate integrating gyro 11 so as to slowly change the reference angle about which the pitch axis of the aircraft is stabilized. When the aircraft finally attains the desired altitude, the pitch angle is held at the value necessary to maintain level flight.

More particularly, the relay 24 couples the altitude error signal from the altimeter 20 through the operated armature 1 of relay 24 to the voltage divider 29 which provides a first signal to an adding circuit 32 for directly controlling the position of the aircraft elevator, not shown, and a second signal to the rate integrating gyro 11 to settle the aircraft to the desired altitude in the event it tends to fly slightly above or below the desired altitude. The first signal to the adding circuit 32 provides for short term control and has a larger magnitude than the second signal to the gyro 11. The low magnitude signal to the gyro 11 is a relatively long term control signal because it causes the aircraft to slowly settle to the desired altitude.

The altitude hold sensor, or altimeter 20 may be of the type manufactured by the Kollsman Instrument Company of Elmhurst, New York under the tradename "Levelok." This altimeter is simplified in the manner by which the pressure sensing bellows movement due to change of altitude is sensed. Briefly, the bellows of the altimeter 20 are connected to a pickoff through a magnetic clutch which can slip if the pickoff travel is greater than that allowed by the stops. None of the components of the altimeter 20 are shown herein. When the aircraft is commanded to climb or dive, the relay 24 is returned to normal, as indicated above, so that the altimeter 20 is electrically disconnected. As the aircraft climbs or dives, the pickoff of the altimeter 20 eventually hits one of its stops, thus creating the condition where the bellows will continue to move, but the slip clutch does not transmit any further movement of the pickoff. When the desired altitude is reached, simultaneous up and down commands of relatively long duration transmitted to the aircraft operate the relay 24 again to reconnect the altitude hold sensor or altimeter 20 into the flight control system. Since the altitude hold pickoff would be against one of the stops, the aircraft would dive, if, for example, the aircraft had been climbing, until the pickoff is at its null position. To reach the null position, the flight control system causes a descent of approximately 100 feet. The aircraft, accordingly, tends to fly at an altitude which is 100 feet below the desired altitude. When the aircraft is diving and an altitude hold mode is commanded, the aircraft gradually rises approximately 100 feet until equilibrim conditions are reached so that it flies approximately 100 feet over the desired altitude at the instant of command. The compromise in performance due to the 100 feet error in altitude is more than offset by the simplicity and reduction in cost of the system utilizing the altimeter 20.

Suppose, for example, the aircraft is in its altitude hold condition with the altimeter 20 at its null position and a strong gust of wind drops the aircraft 100 feet. The altimeter 20 develops an error signal indicative of the 100 feet error and provides it through the operated armature 1 of relay 24 to the divider 29. The divider 29 provides a relatively large signal through the adding circuit 32 and a computer amplifier 36 to an elevator servo 37. The servo 37 puts the aircraft into a climb mode by moving the elevators to increase the pitch angle of the aircraft. The change in pitch is detected at the rate integrating gyro 11 which develops a signal indicating the pitch displacement and rate of change of displacement. The signal from the gyro 11 is introduced to the adding circuit 32 in the opposite sense as the altitude error signal so that, effectively, the two are subtracted or compared. The altitude error signal is also fed into the torquer 12 of the rate integrator to change the reference pitch angle. When the elevators are initially actuated, the pitch angle changes quickly due to the relatively large signal from the divider 29 to the adding circuit 32. The opposed signals will then cause the the pitch to return back to a reference angle for maintaining level flight. The altitude error signal to the torquer 12 corrects for any altitude error necessary to maintain the pitch angle for level flight.

Before proceeding with a description of the rate integrating gyro 11 which provides for the exponential approach to the desired altitude, the operation of the system is first briefly described for a climbing or diving mode. As described above, when the aircraft is commanded from the ground operator to execute a climb or dive mode, the altitude hold reference signal is removed. The duration of the burst of the audio frequency signal modulating the carrier is relatively short compared to the duration of the burst utilized to initiate the altitude hold condition. Assume for example that climb mode is initiated so that relay 22 is operated. When relay 22 operates, it shunts down the relay 24 to return it to normal by providing a pulse from the source 50 through the operated armature 2 of relay 22, a diode 52 and the capacitor 28 to the lower terminal of the winding of relay 24. The upper terminal of the winding of relay 24 is connected through its operated armature 2 to the source 50.

When relay 22 operates, it also couples the source 50 to the torquer 12 of the rate integrating gyro 11 so as to cause a rate of change of pitch attitude for the aircraft. The torquer 12 changes the reference pitch angle so that an error signal is developed by the gyro 11 for operating the servo 37. The pitch rate of the aircraft can be simulated at the ground control box so that the ground operator knows the rate at which the craft is pitching and also the change in angle which he is commanding. Any deviation of the aircraft from this pitch attitude reference is sensed by the gyro 11, and a suitable error signal is developed for moving the elevator of the aircraft in the proper position to cause the aircraft to pitch back to the desired pitch attitude.

The pitch rate integrating gyro 11 is a rate integrating gyro which provides both angular displacement and rate signals. A rate integrating gyro of this type is manufactured by the Whittaker Gyro Company of California and designated model 514285. The gyro is a single degree of freedom, bearing supported gyroscope, which is restrained by the gyro torquer 12. The torquer 12 provides for a torque on the gyro gimbal 13 of the gyro 11, and the gyro gimbal motion is sensed by a pickoff 14 which may be a potentiometer. The pickoff signal is coupled from the pickoff 15 through an appropriate shaping network 14 back to the torquer 12. The potentiometer or pickoff signal current is shaped so that the time derivative or time rate-of-change of current is passed through the force mechanism or torquing coil, not shown, of the torquer 12. A constant rate-of-change of the gimbal position creates a constant current through the torquing coil of the torquer 12. The only external condition which causes a steady state balance of forces is one wherein the gyro is being constantly rotated at a constant rate of change so as to provide a gyroscopic torque which is equal and opposite to that provided by the torquer 12. The gyro gimbal motion or rate of movement is then proportional to the gyro input axis rate of movement.

The mathematical relationship of the signals due to the return loop through the network 14 to the torquer 12 is to effectively multiply the pitch position by the rate of change of pitch and add the product to the pitch position signal. If P is the pitch angle and $W_p$ is the pitch rate, the output of the gyro 11 is $K_1P+K_2W_p$ or includes both position and rate components, where $K_1$ and $K_2$ are constants.

Due to the introduction of the differentiated signals to the torquer 12, the output of the rate integrating gyro causes the aircraft to approach a constant altitude when in the altitude hold condition in an exponential or first order manner. As indicated above, the differentiated signals increase the torque provided by the torquer 12 in accordance with the rate-of-change of pitch angles. For more rapid pitch changes the differentiated signal to the gyro torquer 12 are large, and vice versa for a small altitude error signal. In this manner, the pitch changes with changes in magnitude of the altitude error signal so that the aircraft settles gradually to a desired altitude after the altitude hold signal is received or due to a displacement from the desired altitude, or to correct any altitude error due to an out-of-trim attitude as described above. The gyro 11 may have a ratio of gimbal-to-input axis motion of approximately 1 to 3, a natural frequency of approximately 7 c.p.s., and a damping coefficient which is approximately 0.5 critical damping.

The signal from the gyro 11 is provided through the circuit 32 and amplifier 36 to the servo 37. Without damping, the servo 37 must be driven by a relatively low signal or have a low servo loop gain so as to prevent oscillation of the servo subsystem. However, additional damping is added to the servo, whether of a mechanical form or an electrical nature, the gain of the servo subsystem is increased considerably before a self-sustained oscillation is reached. The effect of this increase in gain is not only to reduce the servo dead spot but also to lower its time constant and increase its natural frequency. The result is that the reduction of the contribution in time lag or phase shift to the overall pitch loop allows a much tighter gain between aircraft motion and elevator motion before this major loop is caused to oscillate.

The elevator positioning subsystem is basically comprised of not only the servo 37 but also the computer amplifier 36 mentioned above which is associated with the elevator servo 37. The elevator servo 37 may be relay driven, which usually creates stability problems. However, by use of appropriate compensating networks 35, this effect can be minimized. The relays, not shown, are driven in response to an error signal which is the result of an angular error displacement in pitch, an error displacement in altitude, or an error displacement of the elevator from the desired position. In addition, the pitch rate signal derived from the rate integrating gyro 11 is also included to enhance the aerodynamic damping.

The longitudinal subsystem 29A, in this manner, controls the position of the elevators of the aircraft during climbs, dives and at constant altitudes. Three of the inputs to the gyro 11 in the subsystem 29A have been described: the "up" and "down" commands provided by operating the relays 22 and 23; and the altimeter error signal provided by operating the relay 24. In addition to these three inputs, a fourth input from a turn computer 25 in the subsystem 29A is provided to the rate integrating gyro 11. As is hereinafter described, the computer 25 provides for a pitch corrective signal during turns to compensate for any tendency of the aircraft to change altitude during a turn due to the operation of the gyro 11.

The aileron control of the aircraft is controlled by the lateral subsystem 28A which was briefly mentioned above. The lateral subsystem 28A is designed to maintain the target on a heading or a rate change in heading as commanded by the ground operator. In the absence of turn command signals, the aircraft flies a straight course even if the aircraft is out-of-trim requiring a wing down and crab attitude to fly such a course. The back angle at which the aircraft flies is only a means toward the end of flying a straight course as sensed by a yaw-roll rate integrating gyro 40. The aircraft can be caused to assume the commanded turn rate whether it is in a climb or dive position.

The roll-yaw sensing instrument is a rate integrating gyro 40 which is similar to the gyro 11 used in the subsystem 29. The gyro 40 is tilted so as to sense not only rolling motions but yawing motions of the aircraft. Any rolling motion from the desired attitude will cause an error signal to be sent to the aileron servo 47 which will cause the aircraft to roll back to the desired position. Similarly, the aircraft may yaw from its desired position in space and the rate integrating gyro 40 will also sense this motion. Such an error signal will also be sent to the same aileron servo 47 causing the aircraft to assume a bank angle which will cause the aircraft to turn in azimuth or yaw and return to the desired yaw position. The equations of motion for such a configuration is one where the aircraft will approach its final roll and yaw position in an exponential manner.

Command signals from the receiver 30 energize the voice coil torquer 41 of the gyro 40 to cause the gyro gimbal 42 to move and consequently the aircraft to turn so that there is an equilibrium of gyroscopic turning torque on the gimbal which is equal and opposite to the command torque. The gyro 40 has the desirable feature that such a torque will result in a rate of motion of the gyro gimbal 42 and a resulting smoothing effect upon pulse signals. The signal from the gyro 40 is provided from the pickoff 43 to the adding circuit 45 and therefrom through an amplifier 46 to the servo 47. The circuit 45, amplifier 46, servo 47, and compensating networks 48 may be similar to the corresponding components in the subsystem 29.

As indicated above, the lateral controls are not functionally isolated from the longitudinal controls because of the turn computer 25 in the longitudinal subsystem 29 which is responsive to lateral control commands. The computer 25 is utilized because the pitch rate integrating gyro 11, when mounted in a winged aircraft, exhibits an undesirable feature. When the aircraft is in a coordinated turn (flying level with no side slip), the bank and turning aircraft causes a nose-up component of turning in azimuth to be sensed by the pitch axis of the aircraft. The pitch rate gyro 11 senses the nose-up rate of change. When flying at level altitudes, the altitude hold signal from the altimeter 20 compensates in part for this nose-up pitching rate, but when the aircraft is in a climb or dive mode, the altitude hold signal is not available for corrective purposes.

Referring to FIGURE 2, the acceleration vector diagram of the aircraft in a coordinated turn at level flight is depicted. When the aircraft is banked, it turns in azimuth about the azimuth axis 100. For a coordinated turn, there is a definite mathematical relationship between the azimuth, yaw and pitch turning rates, all three of which are present. When the plane is banked, an increase of pitch results to maintain a given altitude and resulting in the nose-up pitching rate mentioned above. The pitch rate integrating gyro 11 in the subsystem 29 senses the change of the pitch due to the turning and provides a down signal to the servo 37 causing the aircraft to dive. The diving command results from either a left or a right turn.

The effective diving command during a turn is, however, compensated for by a substantially equal and opposite command signal developed by the turn computer 25. Before proceeding with a description of the computer 25, the mathematical relationships involved are briefly considered.

Referring to FIGURE 2, $W_z$ is the angular rate about the azimuth axis 100, $\theta$ is the bank angle, $G$ is the acceleration due to gravity, $W_p$ is the angular rate about the pitch axis, $W_z$ is the angular rate about the yaw axis, $A_p$ is the incremental acceleration measured by an accelerometer 21 due to the pitch rate, $V$ is the aircraft true velocity along the roll axis, and $A_y$ is the acceleration along a horizontal plane. By making certain approximations, which are valid for small angles, a relationship can be obtained between the pitch rate, as a function of the yaw rate, and the acceleration normal to the pitch axis. This relation is as follows:

$$W_p = W_z \sqrt{\frac{A_p}{G}}$$

This relationship can be derived by assuming that $\theta$, the bank angle is quite small. With $\theta$ small, $G \cos \theta$ is approximately equal to $\theta$. From a consideration of the trigonometry of FIGURE 2, $$\tan \theta = \frac{A_p}{VW_z}$$

and since $\theta$ is small $\tan \theta \approx \theta$. Therefore, $A_p = VW_z\theta$. The sine $$\theta = \frac{VW_z}{G} = \theta$$

and by substituting for $\theta$ in the expression for the acceleration, $$A_p = VW_z \left[ \frac{VW_z}{G} \right] = \frac{V^2 W_z^2}{G}$$

$$A_p \text{ also} = VW_p$$

By solving for V, $$V = \frac{A_p}{W_p}$$

and substituting in the expression for $A_p$, $$A_p = \frac{A_p^2}{W_p^2} \times \frac{W_z^2}{G}$$

By solving for $W_p$, $$W_p = W_z \sqrt{\frac{A_p}{G}}$$

In this manner, by assuming the angle $\theta$ is small, which is true for small turning rates, a relationship is achieved between the pitch and the yaw rate and the acceleration due to the pitch rate. The computer 25, as is further hereinafter described, mechanizes this expression and introduces a compensating signal in accordance therewith to the gyro 11. The signal compensates for the pitch rate due to the turn so that the aircraft is maintained on a level flight. Any small error in the correction due to the assumption of $\theta$ being quite small, is compensated for by the altitude error signal generated by the altimeter 20. This latter correction is, of course, not present in the climbing and diving modes of the aircraft.

As shown in FIGURE 1, the turn computer 25 receives a first input from the accelerometer 21 and a second input from the radio receiver 30 which is indicative of the yaw rate. During turns at constant altitude, the turn computer 25 supplies a correction to the gyro 11 to compensate for the pitch-up effect of the turn, and the altimeter supplies a secondary vernier correction to compensate for this effect. The result is that the aircraft turns without introducing any material inaccurate control to the elevator servo 37. For climbing and diving turns, a small error, which is further hereinafter described, in the compensation exists because of the absence of the vernier correction due to the altimeter 20.

In this manner, the pitch error during turns can be compensated without recourse to air speed instrumentation or auxiliary ground commands. As indicated above, the pitch-up rate is approximately equal to $$W_z \sqrt{\frac{A_p}{G}}$$

with the approximation being due to the assumption that $\theta$ is quite small. More particularly, the error due to this assumption results in the accelerometer providing a signal which is somewhat less than the acceleration normal to the pitch and roll axes. As described above, the acceleration $A_p$ due to pitching of the aircraft is measured by the accelerometer 21. The accelerometer 21, which is mounted so as to sense accelerations normal to the pitch and roll axes, can not discriminate between gravity and accelerations due to pitch rate. However, the accelerometer 21 is biased so that when in level flight there is a zero signal from its potentiometer (not shown). However, as seen in FIGURE 2, when the aircraft is banked, the components of acceleration due to gravity is decreased by the cosine of the bank angle. It then follows that the bias signal which adjusts the accelerometer is now greater than is desired to cancel acceleration due to gravity and leave only acceleration due to pitch rate. The error in this measurement is expressed by the symbol E which is computed and tabulated as follows:

$$E = G(1 - \cos \theta)$$

| $\theta$ Bank Angle Degrees | $\cos \theta$ | $1 - \cos \theta$ | Percent Error $\frac{E}{G}$ |
| --- | --- | --- | --- |
| 0 | 1 | 0 | 0 |
| 5 | .996 | .004 | 4 |
| 10 | .983 | .017 | 1.7 |
| 15 | .965 | .035 | 3.5 |
| 20 | .939 | .061 | 6.1 |
| 25 | .906 | .094 | 9.4 |
| 30 | .865 | .135 | 13.5 |
| 35 | .819 | .181 | 18.1 |
| 40 | .766 | .234 | 23.4 |
| 45 | .707 | .293 | 29.3 |

It will be noticed that for angles up to 20°, the error is small. For climbing or diving conditions, generally only small bank angles are utilized. If large bank angles are utilized, the operator has the opportunity to observe the loss in attitude via the display, not shown, on a radar chart on the ground. Due to this error, the aircraft tends to lose altitude whether the turn is to the right or to the left. Except during the initial phases of launch, this type of error is the more desirable of the two which could be experienced. The error in pitch resulting from the accelerometer error is of interest only during climbing and diving turns because the altimeter 20 provides a vernier correction during turns at constant altitude.

Referring now to FIGURE 3, the turn computer 25 is depicted for mechanizing the expression $$W_z \sqrt{\frac{A_p}{G}}$$

so as to provide an equal and opposite signal to the pitch rate gyro 11 to offset the pitch-up turning sensed by this gyro in a turn. As shown in FIGURE 3, a right or left command is used to provide voltage to a voltage divider including the potentiometer 90 of the accelerometer 21. The potentiometer 90 is serially connected with a resistor 94 between the junction of two diodes 95 and 96 and ground.

The configuration shown is one which will give a square root of the potentiometer arm movement, multiplied by the input voltage, to a fairly high degree of accuracy. An arrangement of this type is conventional and illustratively described on page 320 of the text on Electronic Analog Computers by Konrad Horn published by McGraw Hill, Second Edition 1956. Such arrangements are generally referred to as a computer potentiometer.

The movement of the potentiometer arm is actually proportional to the ratio of the pitch acceleration to the acceleration of gravity $$\frac{A_p}{G}$$

The computer 25 effectively then is a two stage device: the first providing the square root; and the second being a multiplier. The present invention is not restricted to the specific illustrative potentiometer computer as any computer means providing the square root of the ratio signal from the accelerometer and then multiplying it with the yaw rate $W_z$ can be utilized.

The potentiometer output is provided to a smoothing network 97 which may be in the accelerometer 21. A smoothing network 97 is utilized at the output of the potentiometer 90 for two purposes: One is that the turn signals may be pulse modulated signals which are not suitable for injection to the gyro 11 in the pitch command channel; also, transient accelerations due to gusts, etc., which are sensed by the pitch accelerometer 21 are not of interest in the turn computer 25. Therefore, the smoothing network 97 consisting of a resistor 98 and capacitor 99 tend to minimize such transients. The turn computer 25 in its simplest form is, accordingly, merely a passive resistor computer which is extremely low in cost and high in reliability. The diodes 96 and 95 associated with the right and left commands cause the signals to be unidirectional and also to prevent cross feeding of the right-to-left signal commands to the yaw-rate, roll-rate integrating gyro torquer 41. Though the smoothing network 97 is shown in the accelerometer 21, it may be included instead as part of the computer 25. The output from the network 97, whether in the accelerometer 21 or computer 25 is provided to the torquer 12.

If there be any question as to the validity of the pitch reference at the ground position, the subsystem 29 can be synchronized by placing the aircraft in the altitude hold mode and allowing the aircraft to fly at a constant altitude for a short time. It is then known that the gyro 11 has been precessed to the zero reference attitude for that flight condition.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A system for controlling the flight of a drone aircraft, including, gyro means responsive to any change of the pitch of the aircraft about a pitch axis, an accelerometer responsive to any accelerations normal to the pitch and roll axes of the aircraft for developing an indication thereof, means for initiating turning commands at the aircraft, and computer means coupled to said accelerometer and to said initiating means for developing a control signal related to the turn command and the indicated acceleration for introduction to said gyro means for controlling the pitch of the aircraft.

2. A system for controlling the flight of a drone aircraft, including, gyro means responsive to any change of the pitch of the aircraft about a pitch axis, an accelerometer responsive to any accelerations normal to the pitch and roll axes of the aircraft for developing an indication thereof, means for initiating turning commands at the aircraft, computer means for developing a control signal related to the turn command and the indicated acceleration for introduction to said gyro means for controlling the pitch of the aircraft, elevator control apparatus coupled to said gyro means and responsive to a signal from said gyro means for changing the pitch attitude of the aircraft, and altimeter means coupled to said control apparatus and to said gyro means for introducing a first signal directly to said control apparatus in accordance with any difference in altitude of the aircraft from a predetermined altitude and a second signal to said gyro means to change the reference axis of said gyro means, said second signal also being in accordance with any difference in altitude of the aircraft from the predetermined altitude.

3. In a system for controlling the flight of a winged aircraft, gyroscopic means responsive to any change in pitch of the aircraft for providing an elevator correction signal related to such change, said gyroscopic means including torquing means for establishing a pitch reference axis for said gyroscopic means, elevator control apparatus coupled to said gyroscopic means and responsive to the elevator correction signal therefrom for controlling the flight of the aircraft, means at the aircraft for receiving turning commands, accelerometer means for providing a signal related to the ratio of the acceleration of the aircraft perpendicular to the plane of the pitch and roll axes of the aircraft relative to the acceleration of gravity, and computer means coupled to said accelerometer means and to said receiving means for developing a signal related to the product of the rate of aircraft turning as indicated by the turning commands and the square root of the ratio signal from said accelerometer means, and means coupled to said torquing means of said gyroscopic means for introducing the developed signal from said computing means to said torquing means for adjusting the pitch axis reference in accordance therewith.

4. In a system for controlling the flight of an aircraft, gyroscopic means responsive to any change in pitch of the aircraft for providing an elevator correction signal related to such change, said gyroscopic means including torquing means for establishing a pitch reference axis for said gyroscopic means, means for providing signals indicative of the angular yaw rate of the aircraft to affect aircraft turns, and computer means coupled to said providing means and to said torquing means for introducing a signal to said torquing means in accordance with the following expression:

$$W_z \sqrt{\frac{A_p}{G}}$$

where $W_z$ is the angular yaw rate and $A_p$ is the acceleration of the aircraft perpendicular to the plane including the pitch and roll axes of the aircraft and G is the acceleration due to gravity.

5. A flight control system for an aircraft, including, a pitch rate integrating gyro, elevator control apparatus coupled to said gyro and responsive to a signal from said gyro for changing the pitch attitude of the aircraft, andn altimeter means coupled to said control apparatus and to said gyro for introducing a first signal directly to said control apparatus in accordance with any difference in altitude of the aircraft from a predetermined altitude and a second signal to said gyro to change the reference axis of said gyro, said second signal also being in accordance with any difference in altitude of the aircraft from the predetermined altitude.

6. A flight control system for an aircraft in accordance with claim 1, including, in addition, a turn computer coupled to said gyro for introducing to said gyro during a turn a signal compensating for the reaction of said gyro to a turn.

7. A system for controlling the flight of an aircraft, including, a pitch rate integrating gyroscope including torquing means for establishing a pitch reference axis at the aircraft, differentiating means coupled from the output of the gyroscope to said torquing means for changing the pitch reference axis in accordance with the rate of change of the output of said gyroscope, control apparatus coupled to the output of the gyroscope for changing the attitude of the aircraft in accordance with the output of the gyroscope, and altimeter means coupled directly to said control apparatus and also to said torquing means for introducing signals to said control apparatus and to said torquing means related to any difference in altitude from a reference altitude.

8. A system for controlling the flight of an aircraft in accordance with claim 7 wherein the signal introduced to said torquing means from said altimeter means is smaller in magnitude than the signal introduced to said control apparatus from said altimeter means, said control apparatus including means for comparing the output of said gyroscope with the signal from said altimeter means and for adjusting the altitude of the aircraft in accordance with the comparison.

9. A system for controlling the flight of an aircraft in accordance with claim 7, including, in addition, means at the aircraft for receiving turning commands, accelerometer means for providing a signal related to the ratio of the acceleration of the aircraft perpendicular to the plane of the pitch and roll axes of the aircraft relative to the acceleration of gravity, and computer means coupled to said accelerometer means and to said receiving means for developing a signal related to the product of the rate of aircraft turning as indicated by the turning commands and the square root of the ratio signal from said accelerometer means, and means coupled to said torquing means of said gyroscope for introducing the developed signal from said computer means to said torquing means for adjusting the pitch axis reference in accordance therewith.

10. A flight control system at an aircraft, including, means for providing signals indicating flight commands, a lateral subsystem responsive to the commands for controlling the yaw of the aircraft, and a longitudinal subsystem responsive to the flight commands for controlling the pitch of the aircraft, and computer means responsive to said flight command signals indicating change in yaw and to lateral acceleration of said aircraft for developing a signal relating to the yaw change and said lateral acceleration.

11. A flight control system for an aircraft, for changing the altitude of said aircraft in response to command signals including, a rate integrating gyro in the pitch mode including torquing means for determining the pitch reference axis, elevator control apparatus for adjusting the attitude of the aircraft and including signal comparison means coupled to the output of said gyro, altimeter means for providing a signal related to any difference in altitude of the aircraft from a reference altitude, gating means coupled to said altimeter means for introducing the signal from said altimeter to said torquing means and to said signal comparison means whereby at the comparison means the altimeter signal is compared with the output of the gyro, and means coupled to said last-mentioned means and responsive to said command signal for operating said gating means to inhibit the signal from said altimeter means.

References Cited in the file of this patent

UNITED STATES PATENTS

| | | |
|---|---|---|
| 1,869,840 | Boykow | Aug. 2, 1932 |
| 2,627,384 | Esval | Feb. 3, 1953 |
| 2,651,015 | Meredith | Sept. 1, 1953 |
| 2,821,349 | Sohn | Jan. 28, 1958 |
| 2,842,324 | Jude et al. | July 8, 1958 |